No. 683,388. Patented Sept. 24, 1901.
N. CURTIS.
REDUCING VALVE.
(Application filed Jan. 29, 1900. Renewed Mar. 5, 1901.)
(No Model.)
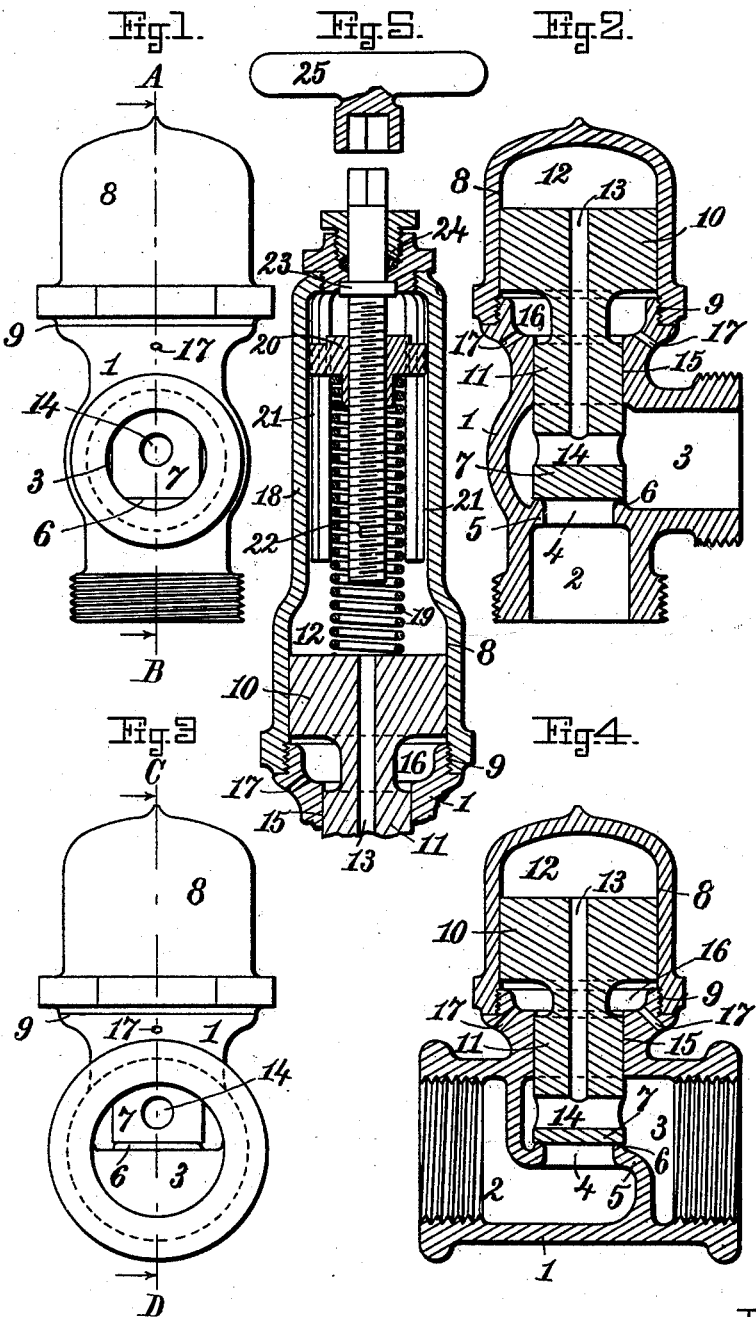

UNITED STATES PATENT OFFICE.

NELSON CURTIS, OF BOSTON, MASSACHUSETTS.

REDUCING-VALVE.

SPECIFICATION forming part of Letters Patent No. 683,388, dated September 24, 1901.

Application filed January 29, 1900. Renewed March 5, 1901. Serial No. 49,922. (No model.)

*To all whom it may concern:*

Be it known that I, NELSON CURTIS, of Boston, in the county of Suffolk and State of Massachusetts, have invented certain new and useful Improvements in Reducing-Valves, of which the following is a specification.

This invention relates to fluid-pressure reducing-valves, and is an improvement on the reducing-valve described in United States Letters Patent No. 608,345, granted to C. E. Rettew and W. R. Johnson August 2, 1898.

It has for its object to provide a compact and durable structure, the improvement having particular reference to the junction of casing parts and contemplating the provision of a valve having casing parts joined at a point subjected to little or no pressure, whereby the durability and effectiveness of the joint are increased.

The invention consists in certain novel features of construction and arrangement, which I shall now proceed to describe and claim.

Of the accompanying drawings, Figure 1 represents a front elevation of an angle form of valve constructed in accordance with my invention. Fig. 2 represents a section thereof on the line A B of Fig. 1. Figs. 3 and 4 represent similar views of a straight form of valve, Fig. 4 being a section on the line C D of Fig. 3. Fig. 5 represents a sectional view of the upper part of a modification.

The same reference characters indicate the same parts in all the figures.

Referring to the drawings, Figs. 1 to 4, inclusive, 1 designates a valve-casing having an inlet-chamber 2 and an outlet-chamber 3, connected by an aperture 4, which is formed in a partition 5, separating the two chambers. An annular valve-seat 6 surrounds said aperture on the outlet side of the partition, and a valve 7 is mounted for movement perpendicularly toward and from said valve-seat to open and close the passage between the chambers.

8 is a cylinder formed integrally in one piece and connected by a screw-threaded joint at 9 with the upper part of the valve-casing 1, the bore of said cylinder being of less diameter than the screw-threaded portion thereof, so that a piston which operates in said cylinder, as hereinafter described, can be inserted and withdrawn through the said screw-threaded portion.

10 is a piston fitting in the bore of the cylinder 8 and connected by a stem 11 with the valve 7, the valve and piston being here shown as integrally formed in one piece, though they are not necessarily so formed. The space 12 on the upper or outer side of said piston, between the piston and the outer cylinder, constitutes a pressure-chamber, which is in connection with the outlet-chamber 3 by means of a duct 13, which passes vertically through the stem and piston and has a bottom horizontal portion 14.

The cylinder 8, as above stated, is formed integrally in one piece. Said cylinder is also closed in the sense that there is no opening therefrom excepting the duct 13, passing through the piston and its stem.

The valve-casing 1 has a cylindrical aperture 15, connecting the outlet-chamber 3 with the space 16 below the piston 10, and the stem 11 has a cylindrical portion closely fitting said aperture and shutting off the passage of fluid through the aperture. The diameter of the said portion of the stem is made at least as great as the diameter of the valve 7, so that the valve can be removed upwardly through the aperture 15. In the drawings the valve and the said portion of the stem are shown as of the same diameter.

The space 16, which exists on the inner side of the piston 10 and surrounds the outer portions of the stem 11, constitutes a neutral space, which is not reached to any appreciable extent by the fluid-pressure. Said space may be advantageously connected with the atmosphere by means of one or more drainage-ducts 17. To enable the piston and valve to move freely regardless of the variation which they cause in the size or capacity of the neutral space, provision is made for allowing air to pass freely to or from said space. In the form of device illustrated in the drawings the ducts 17 perform this function. It is to be noted that the joint 9 between the cylinder 8 and the valve-casing 1 surrounds or coincides with this neutral space 16, and the said joint is therefore not subjected directly to the pressure of the fluid which the valve controls. In the patent hereinbefore mentioned the cylinder in which the piston operates is connected to the valve-casing by a joint, which is subjected to the full fluid-pressure from the outlet-chamber. This requires a careful construction of the joints and is not conducive to durability nor simplicity, objections which are obviated in my present form of valve.

In Fig. 5 the cylinder 8 is shown as provided with an elongation or extension 18, which incloses a spring 19. The latter bears on the upper side of the piston 10 and assists the terminal pressure in holding the valve 7 to its seat. The spring is confined by a nut 20, mounted for vertical movement and prevented from rotating by means of guides 21 21 on the wall of the extension 18. A screw-spindle 22 passes through said nut, and when rotated by suitable means, such as the hand-wheel 25, it moves the nut up or down to vary the tension of the spring. The spindle passes through a stuffing-box 24 in the upper end of the casing or extension 18 and is prevented from moving longitudinally upward by means of a shoulder 23.

I claim—

1. A reducing-valve comprising a casing having inlet and outlet chambers, a valve-seat between said chambers, a valve adapted to close to said seat against the pressure in the inlet-chamber, a closed cylinder removably attached to the valve-casing, a piston operating in said cylinder, a stem connecting said piston with the valve, and a duct through said stem connecting the outlet-chamber with the space between the outer end of the cylinder and the piston, there being a neutral space surrounding said stem between the valve and the inner end of the piston, provision being made for the passage of air to or from said space, the joint between the cylinder and valve-casing coinciding with or surrounding said space.

2. A reducing-valve comprising a casing having inlet and outlet chambers, a valve-seat between said chambers, a valve adapted to close to said seat against the pressure in the inlet-chamber, a closed cylinder made in one integral piece and removably attached to the valve-casing, a piston of larger area than the valve, operating in said cylinder, a stem connecting said piston with the valve, and a duct through said stem connecting the outlet-chamber with the space between the outer end of the cylinder and the piston, there being a neutral space surrounding said stem between the valve and the inner end of the piston, provision being made for the passage of air to or from said space, the joint between the cylinder and valve-casing coinciding with or surrounding said space.

3. A reducing-valve comprising a casing having inlet and outlet chambers, a valve-seat between said chambers, a valve adapted to close to said seat against the pressure in the inlet-chamber, a cylinder removably attached to the valve-casing, a piston of larger area than the valve, operating in said cylinder, a stem connecting said piston with the valve, a duct connecting the outlet-chamber with the space between the outer end of the cylinder and the piston, there being a neutral space surrounding said stem between the valve and the inner end of the piston, the joint between the cylinder and valve-casing coinciding with or surrounding said space, an aperture in the casing extending from said neutral space to the outlet-chamber, and a portion on the said stem closely fitting said aperture, said portion having a diameter at least as great as the diameter of the valve, whereby the latter may be removed through said aperture.

4. A reducing-valve having inlet and outlet chambers, a valve adapted to close to said seat against the pressure in the inlet-chamber, a closed cylinder removably attached to the valve-casing and provided with an extension, a piston operating in said cylinder, a spring in the cylinder extension bearing on the piston, means for varying the tension of the spring, a stem connecting the piston with the valve, and a duct through said stem connecting the outlet-chamber with the space between the outer end of the cylinder and the piston.

In testimony whereof I have affixed my signature in presence of two witnesses.

NELSON CURTIS.

Witnesses:
C. F. BROWN,
A. D. HARRISON.